United States Patent [19]  [11] Patent Number: 5,436,885
Okumura et al.  [45] Date of Patent: Jul. 25, 1995

[54] OPTICAL DISC AND OPTICAL SYSTEM FOR REPRODUCING THE OPTICAL DISC

[75] Inventors: Yoichi Okumura; Tetsuya Iida; Hitoshi Taniguchi, all of Saitama, Japan

[73] Assignee: Pioneer Electronic Corporation, Tokyo, Japan

[21] Appl. No.: 207,201

[22] Filed: Mar. 8, 1994

[30] Foreign Application Priority Data

Mar. 12, 1993 [JP] Japan .................................. 5-052501

[51] Int. Cl.$^6$ .............................................. G11B 7/24
[52] U.S. Cl. ........................ 369/275.2; 369/275.5; 369/283; 369/284; 369/285; 369/444.37; 428/64.4
[58] Field of Search ............... 369/275.1, 275.2, 275.3, 369/44.37, 285, 286, 283, 275.5, 44.38, 284; 428/64, 65

[56] References Cited

U.S. PATENT DOCUMENTS

| | | | |
|---|---|---|---|
| 4,841,514 | 6/1989 | Tsuboi et al. | 369/44.37 |
| 4,893,298 | 1/1990 | Pasman et al. | 369/44.37 |
| 5,061,582 | 10/1991 | Brettle et al. | 430/19 |
| 5,235,582 | 8/1993 | Taniguchi et al. | 369/275.2 |
| 5,252,371 | 10/1993 | Taniguchi et al. | 428/64 |

Primary Examiner—Joseph A. Popek
Assistant Examiner—Tan Nguyen
Attorney, Agent, or Firm—Nikaido Marmelstein Murray & Oram

[57] ABSTRACT

An optical disc has a recording film with information recorded thereon, and a photochromic material film provided adjacent the recording film. The photochromic material film is made of a photochromic material. The photochromic material has a first state irradiated with reading light having a first wavelength. In the first state, the transmittance of the material is increased so as to enable reading of the recorded information. The photochromic material further has a second state irradiated with auxiliary light having a second wavelength, where the transmittance becomes low so as to disable the reading of the recorded information.

4 Claims, 17 Drawing Sheets $$\frac{b}{a} = \varepsilon$$

d=Plot[((BesselJ[1,2Pir]/r − (3/2) BesselJ[1,(3/2) Pir]/r) ^ 2, {r,−2,2}]

OPTICAL DISC AND OPTICAL SYSTEM FOR REPRODUCING THE OPTICAL DISC

BACKGROUND OF THE INVENTION

The present invention relates to an optical disc and an optical pickup control system for reproducing the optical disc, and more particularly to a system for reproducing information on an optical disc having a high recording density.

The optical disc has a central hole and a recording track spirally formed on the outer periphery of the hole for recording information thereon.

FIG. 18a shows a structure of a conventional optical disc.

An optical disc 60 comprises a substrate 61 made of a transparent material of acrylic resin such as polymethylmethacrylate (PMMA) resin. On the substrate 61, a plurality of phase pits 62 as recorded information are formed. A reflection film 65 is coated on the substrate 61. The reflection film 65 is made of metal such as aluminum coated by vacuum deposition. A protection film 64 made of plastic is provided for covering the reflection film 65.

The information recorded on the disc 60 is read out by a laser beam 70. A spot diameter r of the beam 70 is represented by an equation as follow.

$$r = k \cdot \lambda / NA$$

where k is constant (about 0.82, if the spot diameter of the beam is determined in the range between a peak intensity of the spot and a light intensity of $1/e^2$), $\lambda$ is the wavelength of the laser beam, and NA is Numerical Aperture (normally 0.4 to 0.6 for reproduction).

The phase pits 62 are irradiated with the laser beam 70 through the substrate 61 for reproducing the information. As shown in FIG. 18b, the light 71 reflected at the area other than the pit 62 is detected to be a high intensity. The light 71' reflected on the pit 62 is detected to be low of the intensity because of diffusion.

The information is reproduced in accordance with the quantity of the reflected light. The spot diameter of the beam is determined based on the wavelength of the laser beam. In the high-density disc, in order to increase the recording density, the pitch of the recording track is reduced or the length of the pit is decreased. Accordingly, as shown in FIG. 18c, a plurality of phase pits 80a, 80b and 81 are included in a beam spot 82. Information on the pits 80a, 80b, 81 are detected at the same time. Since the information can not be separated with each other, it is impossible to reproduce information with accuracy.

SUMMARY OF THE INVENTION

An object of the present invention is to provide an optical pickup reproducing system for an optical disc having a high recording density in which crosstalk is reduced, thereby accurately reproducing information.

According to the present invention, there is provided an optical disc having a recording film with information recorded thereon comprising, a photochromic material film provided adjacent the recording film, the photochromic material film being made of a photochromic material which has a first state dependent on reading light having a first wavelength, where transmittance of the material is increased so as to enable reading of the recorded information, and has a second state dependent on auxiliary light having a second wavelength, where the transmittance becomes low so as to disable the reading of the recorded information.

The present invention further provides a system for reproducing the optical disc comprising, a first optical system for irradiating a first zone of the optical disc with the reading light, a second optical system for irradiating a second zone adjacent the first zone with the auxiliary light, a reproducing system for receiving reading light reflected from the optical disc and for reproducing the recorded information.

The beam of the auxiliary light has a sectional shape of a ring arround the beam of the reading light.

Other objects and features of this invention will become understood from the following description with reference to the accompanying drawings.

DETAILED DESCRIPTION OF THE PREFERRED EMBODIMENTS

Figure 2:
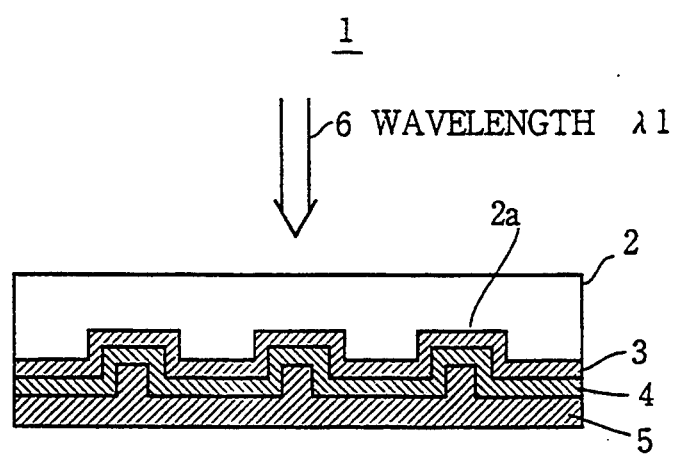
FIG. 2 is a schematic sectional view showing an optical disc according to the present invention.

Referring to FIG. 2, an optical disc 1 of the present invention comprises a recording film (substrate) 2 having phase pits 2a, a photochromic material film 3 coated on the recording film 2, a reflection film 4 coated on the photochromic material film 3, and a protection film 5 covering the reflection film 4.

First, the principle of the present invention will be described.

In general, if the photochromic material is irradiated with light, an isomer of the material reversibly changes to another isomer having a different absorption spectrum.

Figure 1:
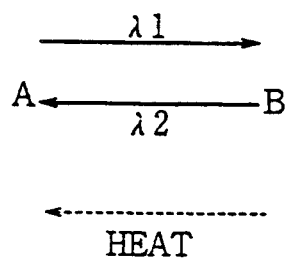
FIGS. 1a and 1b show characteristics of photochromic material.
Figure 1:
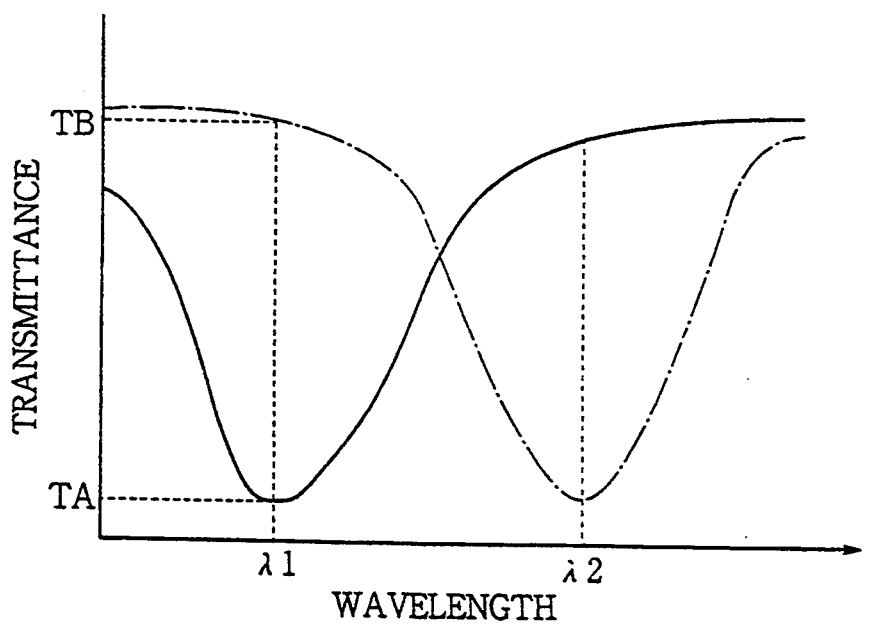

As shown in FIG. 1a, if the photochromic material having an isomer A (first state) is irradiated with light having a wavelength of $\lambda 1$, the isomer A changes to an isomer B (second state) at a high speed (picosecond to nanosecond) in accordance with the reaction of photon. Thereafter, if the light is turned off and the photochromic material is left as it is, the isomer B is returned to the original isomer A.

FIG. 1b shows examples of spectrums of transmitted lights in the isomers A and B of the photochromic material respectively. It will be seen that a transmittance $T_A$ of the beam having the wavelength $\lambda 1$ in the isomer A is relatively lower than a transmittance $T_B$ of the beam in the isomer B.

When the recording film 2 is irradiated with the light having the wavelength of $\lambda 1$ for reading the information recorded thereon, the light is transmitted in the photochromic material film 3. In an area irradiated with light having a high intensity, the isomer B is superior to the isomer A. Thus, the transmittance in the isomer B is largely increased. The transmitted light is reflected on the reflection film 4 so that the information on the recording film 2 in the isomer B can be read out. In an area irradiated with light having a low intensity, although the isomer A changes to the isomer B, the rising ratio of reflectance is low. Consequently, the information on the recording film 2 can not be read out.

Therefore, if the light intensity distribution is set so as to reduce a zone for reading the information (hereinafter called information reading zone) on the recording film 2, the diameter of the light transmitted in the photochromic film 3 can be reduced smaller than the theoretical value, thereby enabling to reproduce information on the high-density disc.

In such a system, the isomer B on the reproduced track must be returned to the original isomer A when the adjacent track is read out. If not, both of the information on both tracks are read out so that accurate information can not be reproduced. However the returning speed of the isomer B to the isomer A is low. It is about millisecond to minute to regain the original state of the photochromic material film. On the other hand, the time for reading one track is about 10 to 100 milliseconds. Therefore, it is uncertain that the original isomer is regained when the next track is read out.

Meanwhile, if the photochromic material in the isomer B state is irradiated with light having the wavelength of $\lambda 2$ which is absorbed in the material, the isomer B changes to the isomer A at a high speed. (picosecond to nanosecond).

In the present invention, in order to avoid the influence of the adjacent track read out the last time, an auxiliary light having the wavelength of $\lambda 2 : \lambda 1 < \lambda 2$ is used as a masking light for masking an area other than the read out area which is changed to the isomer A. Thus, it is possible to reproduce the information in the information reading zone.

Figure 3:
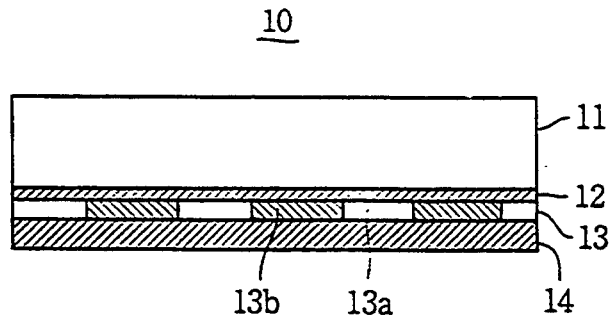
FIG. 3 is a schematic sectional view showing another type of the optical disc of the present invention.

FIG. 3 shows another type of the optical disc of the present invention in which information is recorded on a recording film by providing differences of the reflectance.

The optical disc 10 comprises a substrate 11, a photochromic material film 12 coated on the substrate 11, a recording film 13 having a high-reflectance area 13a and a low reflectance area 13b and coated on the photochromic material film 12, and a protection film 14 covering the recording film 13.

As the photochromic material for the photochromic film, there are provided spiropyran system, spirooxadine system, allylethene system, viologen system, dihydropyren system, thioindigo system, aziridine system and others. Furthermore, photochromic polymer may be used.

The photochromic material is coated by spin coating or vacuum deposition.

Figure 4:
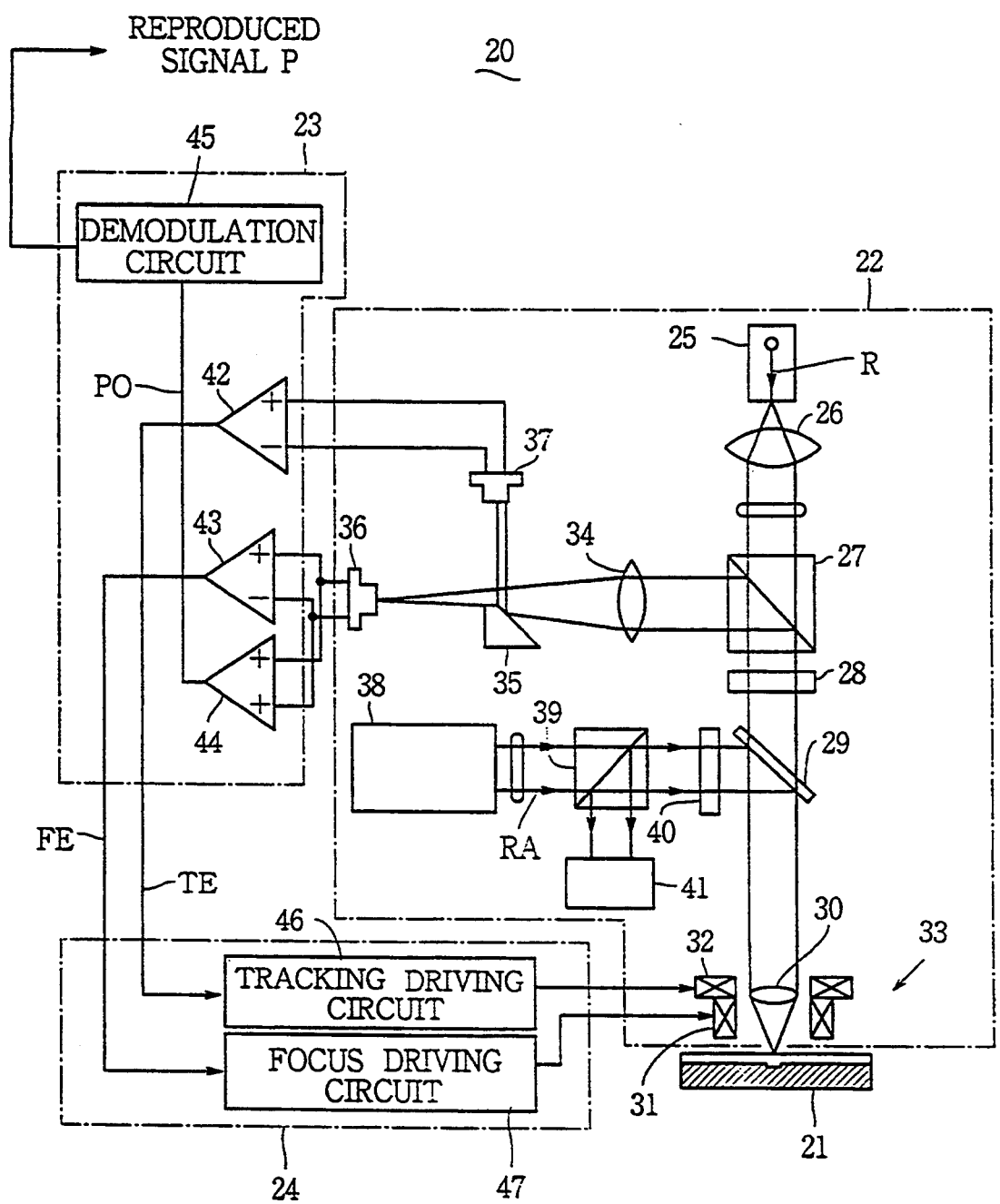
FIG. 4 is a block diagram showing an optical pickup reproducing system of the present invention.

Referring to FIG. 4 showing an optical disc reproducing system according to the present invention, the system comprises an optical pickup 22 for reading the information recorded on an optical disc 21, a signal processing unit 23 for processing a reproduced signal, and an optical pickup control unit 24 for controlling the optical pickup 22.

The optical pickup 22 has first and second semiconductor lasers 25 and 38 each of which produces a laser beam having a different wavelength from the other. The first semiconductor laser 25 produces a laser beam R having the wavelength of $\lambda 1$ as a reading light. The second semiconductor laser 38 produces a laser beam RA having the wavelength of $\lambda 2$ as an auxiliary light.

The laser beam R emitted from the semiconductor laser 25 is paralleled through a collimator lens 26 and fed to a quater-wave plate 28 passing through a first beam splitter 27. In the quater-wave plate 28, the phase of the laser beam R is deflected with the phase difference of quater wavelengths. The beam of $\lambda 1$ wavelength is fed to a dichroic mirror 29 and passes through there, the beam reaches an optical disc 21, focused thereon by an objective 30.

The reflected light from the optical disc 21 is reflected on the first beam splitter 27 passing through the dichroic mirror 29 and the quarter-wave plate 28. In this state, the light is deflected with the phase difference of half wavelengths. At the beam splitter 27, the beam is changed in a perpendicular direction and supplied to a condenser 34. The light is focused on a photodetector 36 passing through a prism 35 which has a knife edge portion for shielding the light. Two-divided photo sensors are provided in the photodetector 36. The light from the condenser 34 is reflected on the prism 35 and fed to a photodetector 37. Photodetectors 36 and 37 operate to convert the light into electric signals.

An actuator 33 comprising a focus actuator 31 and a tracking actuator 32 is provided around the objective 30 for moving the objective in the focus direction and tracking direction.

The laser beam RA emitted from the second semiconductor laser 38 is fed to the dichroic mirror 29 passing through a second beam splitter 39 and a quater-wave plate 40. The laser beam is reflected on the dichroic mirror 29 to the optical disc 21 and focused thereon by the objective 30.

The reflected light from the optical disc 21 is reflected on the dichroic mirror 29 to the beam splitter 39 through the quater-wave plate 40. In the beam splitter 39, the light is changed in a perpendicular direction and supplied to a photodetector 41. The photodetector 41 is provided for monitorning an output power of the auxiliary beam and controlling the intensity of the light.

The signal processing unit 23 comprises a first subtracting amplifier 42 applied with the output signal of the photodetector 37 of the pickup 22, a second subtracting amplifier 43 and an adding amplifier 44 both of which are applied with output signals of the two-divided photodetector 36. The first subtracting amplifier 42 amplifies the input signal and produces a tracking error signal TE which is applied to a tracking driving circuit 46 of the pickup control unit 24. The second subtracting amplifier 43 amplifies the input signal and produces a focus error signal FE which is applied to a focus driving circuit 47 of the control unit 24. The adding amplifier 44 amplifies the input signal and produces an original reproduced signal Po which is applied to a demodulation circuit 45. The demodulation circuit 45 demodulates the signal Po to a reproduced signal P.

The tracking driving circuit 46 and the focus driving circuit 47 apply actuating signals to the actuator 32 and 31, respectively.

Figure 5:
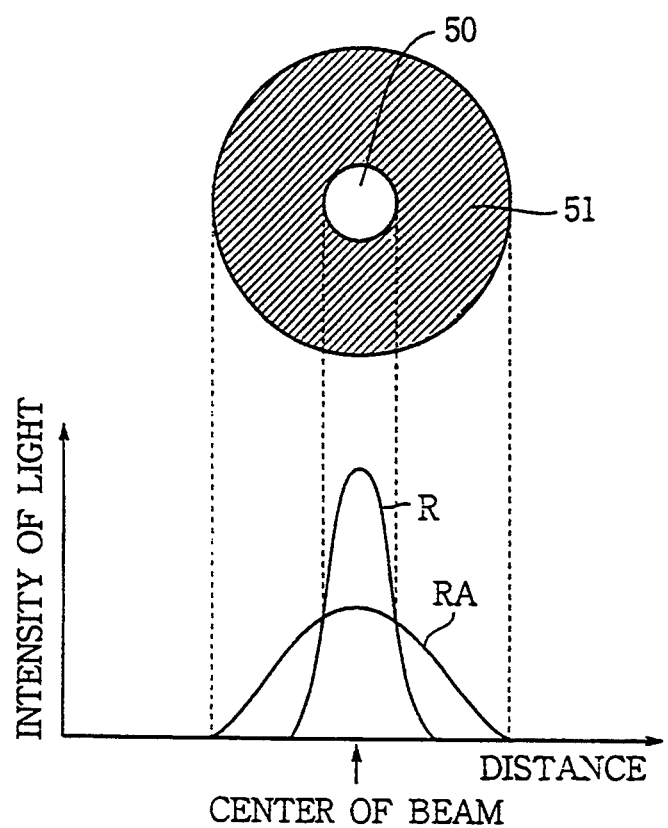
FIGS. 5a and 5b are diagrams showing emitted states of two types of lights on the disc.

The operation of the system will be described with reference to FIGS. 5 to 7.

If the ratio of the peak intensity of the laser beam R to the laser beam RA is 2:1, the beam RA is overlapped with the beam R. FIG. 5b shows the distribution of the light intensities of the beams R and RA. As shown in FIG. 5a, the intensity distribution of both lights consists of a concentric circle. An inner circle 50 is the information reading zone and an outer circle 51 except for the inner circuit 50 is a masking zone.

In the information reading zone 50, the isomer B is superior to the isomer A so that the information can be read out. In the masking zone 51, the isomer A is superior to the isomer B so that the information can not be read out.

Figure 6:
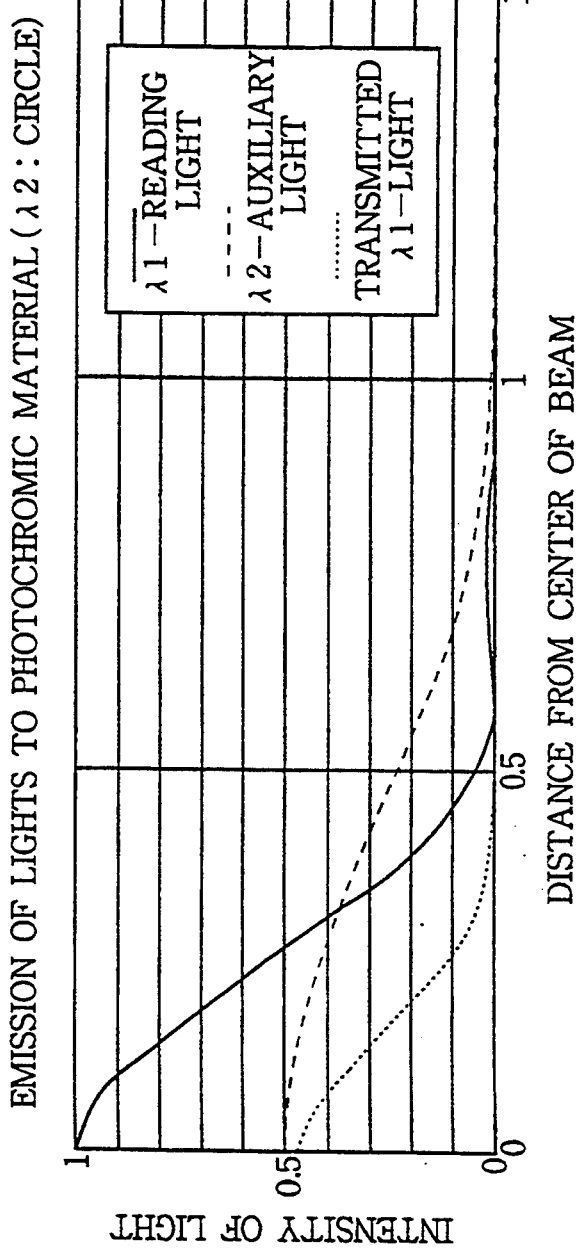
FIGS. 6 and 7 are diagrams of distributions of intensities of lights for explaining operations of the system.
Figure 7:
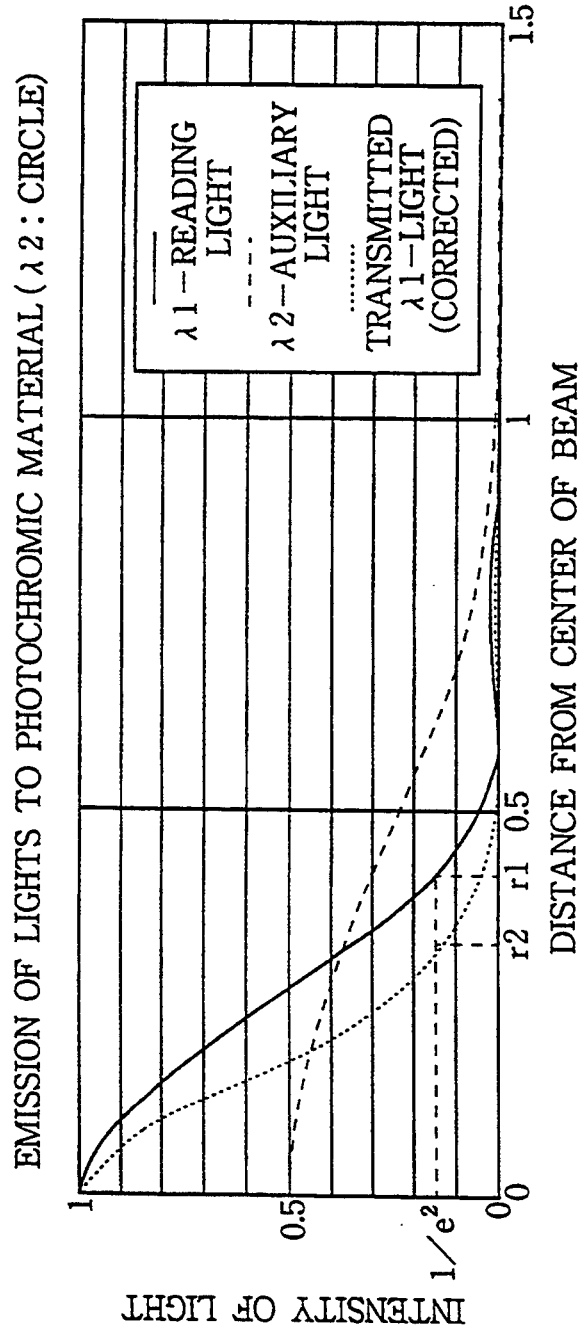

FIG. 6 shows luminous intensities of the reading beam of the λ1-wavelength, auxiliary beam of α2-wavelength, and the reading beam transmitted to the photochromic film. The ratio of intensities is 2:1. The auxiliary beam is emitted in the form of circle. FIG. 7 shows intensities of the same beams in which a peak intensity of the transmitted light is corrected to 1.

As shown in FIG. 6, if the intensity of the incident reading light (λ1) is 1, the transmitted light becomes 0.5 so that the intensity is decreased. However, in FIG. 7, the diameter r2 of the transmitted light is smaller than the diameter r1 of the reading light. Thus, it is possible to read out small pits encompassed in the spot of the reading light.

Figure 8:
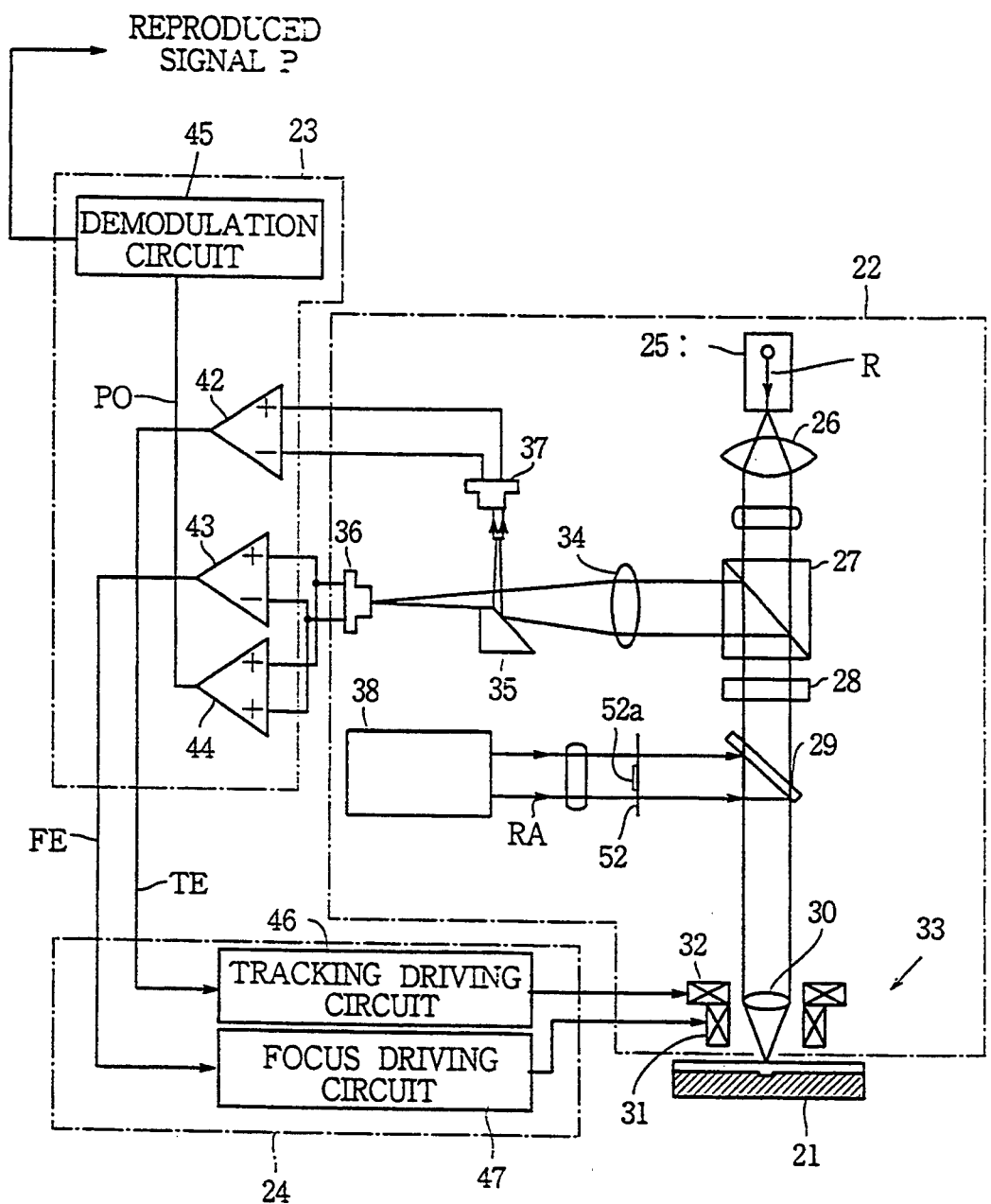
FIG. 8 is a block diagram showing a second embodiment of the present invention.

FIG. 8 shows a second embodiment of the present invention. Elements which are the same as the first embodiment are identified with the same reference numerals as FIG. 4.

In the second embodiment, the optical pickup system is operated by a phase shifting method to produce auxiliary light having a sectional shape of a circle or a ring. Accordingly, in the system, a phase shifting mask 52 having a phase shifter 52a is provided between the second laser 38 and the dichroic mirror 29 in place of the second beam splitter 39 and the quater-wave plate 40.

Figure 9:
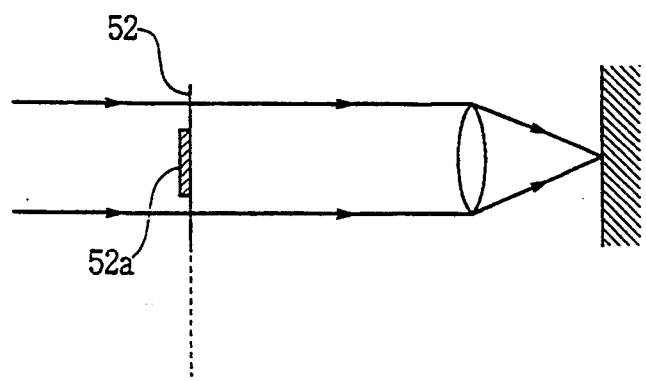
FIGS. 9a and 9b are diagrams explanatory showing a phase shifting method of the second embodiment.
Figure 9:
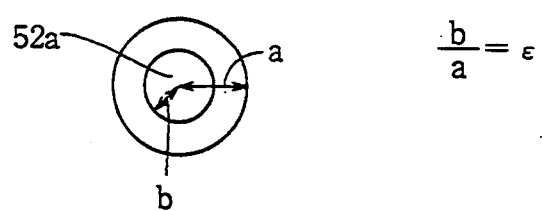

As shown in FIGS. 9a and 9b, the phase shifter 52a is in the form of circle (radius b) and provided in the center of the parallel luminous flux (radius a) of the coherent light so as to shift the phase by $\pi$. The intensity of light varies in accordance with radius ratio $\epsilon$ of $\epsilon = b/a$.

Figure 10:
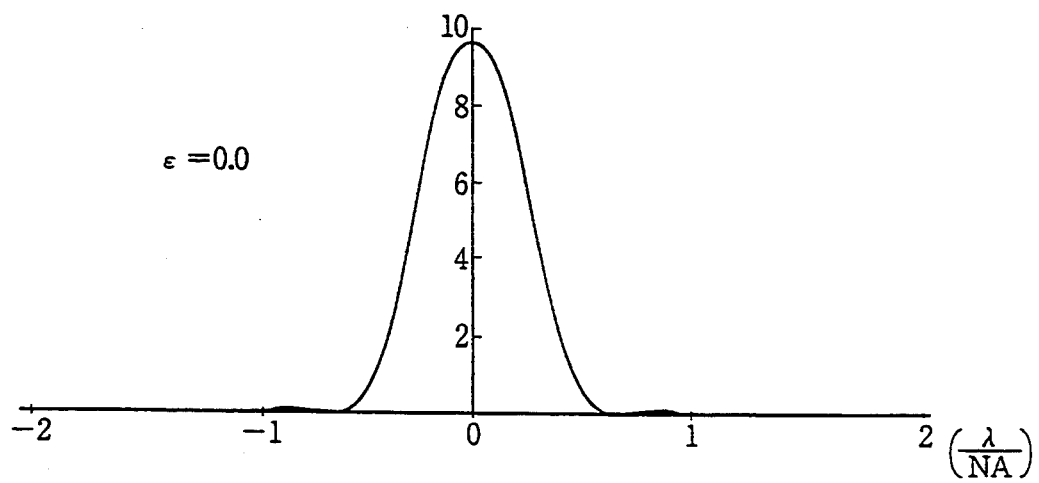
FIGS. 10, 11, 12 and 13 are diagrams showing intensity distributions of auxiliary lights.
Figure 11:
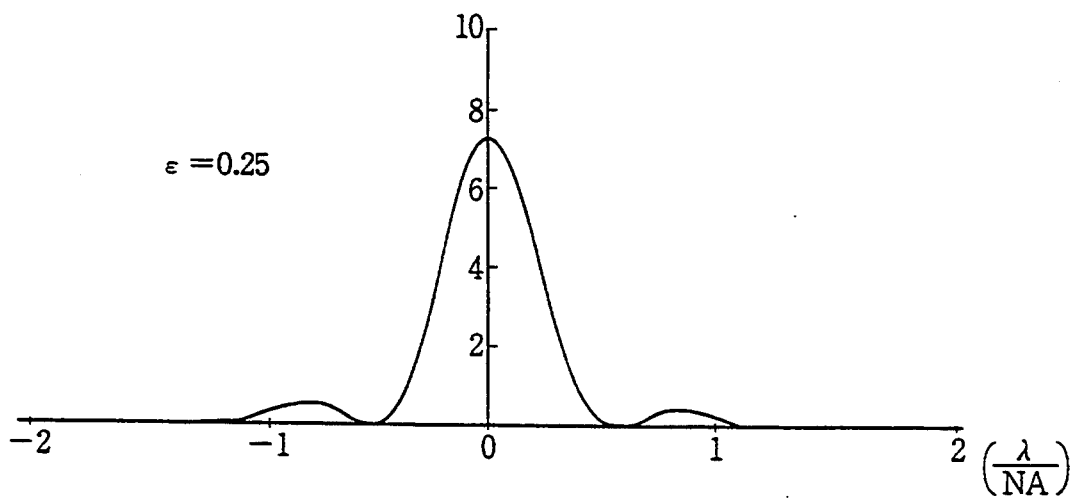
Figure 12:
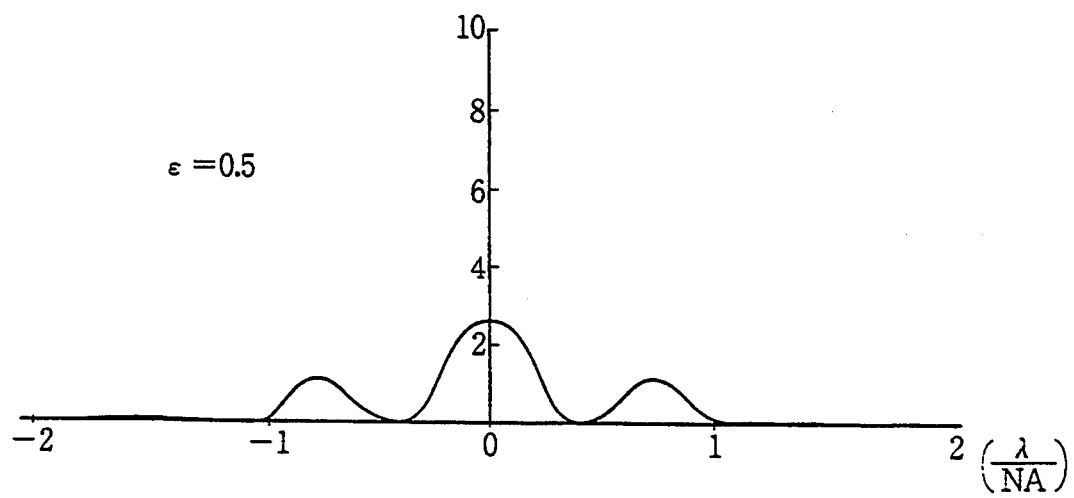

FIGS. 10 to 13 show distributions of intensity of the auxiliary light in dependency on the radius ratio $\epsilon$. FIG. 10 is the distribution when the radius ratio $\epsilon$ is 0.0. In FIG. 11, the radius ratio $\epsilon$ is 0.25, in FIG. 12, 0.50 and in FIG. 13, 0.75. As the ratio increases, the intensity is reduced in the center thereof, and increased in the periphery thereof.

Figure 13:
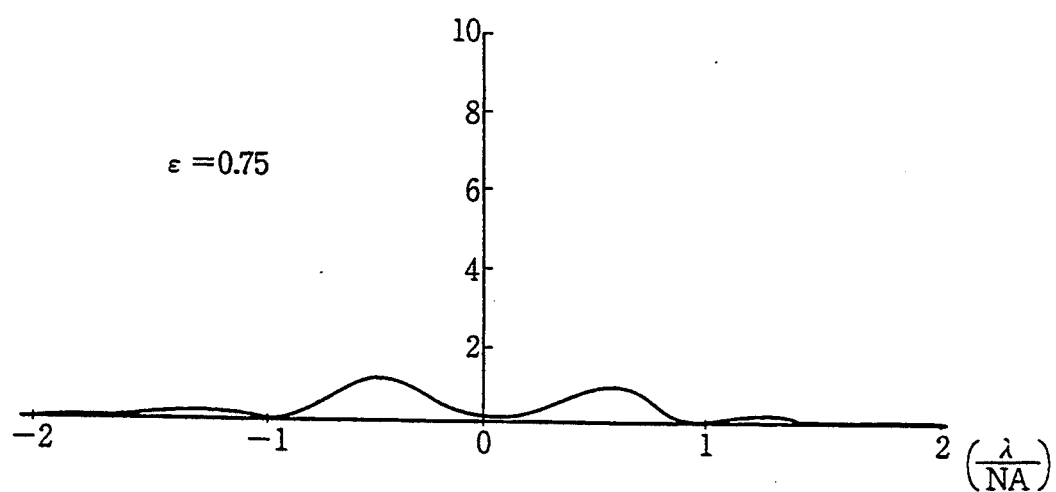

As shown in FIG. 13, when the ratio $\epsilon$ is 0.75, the sectional shape of the auxiliary light is becomes a ring.

FIGS. 14 to 17 show intensities of reading light and auxiliary light of the second embodiment.

Figure 14:
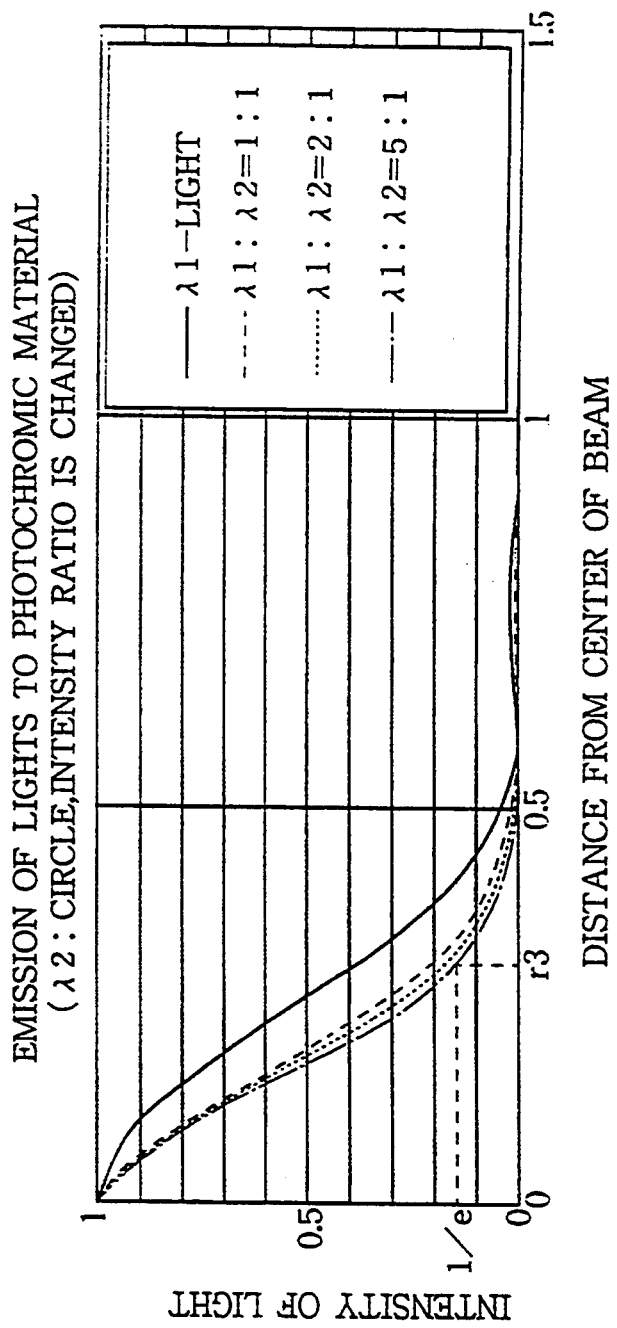
FIGS. 14, 15, 16 and 17 are diagrams of intensity distributions of the lights for explaining operations.

As shown in FIG. 14, if the auxiliary light (λ2) of circle is emitted, as the intensity ratio of the reading light to the auxiliary light becomes large, the diameter of the beam becomes small. When the intensity ratio is 5:1, the diameter r3 becomes minimum. However, the diameter r3 is larger than the diameter r4 of the corrected transmitted light of the reading light without the auxiliary light shown in FIG. 15. However, by emitting the auxiliary light, masking is effectively obtained, thereby reducing crosstalk between information pits in the direction of the recording track.

Although a central portion of the spot is irradiated with the auxiliary light of λ2, the central portion does not change into the isomer A, because the intensity of the reading light is larger than the auxiliary light.

Figure 15:
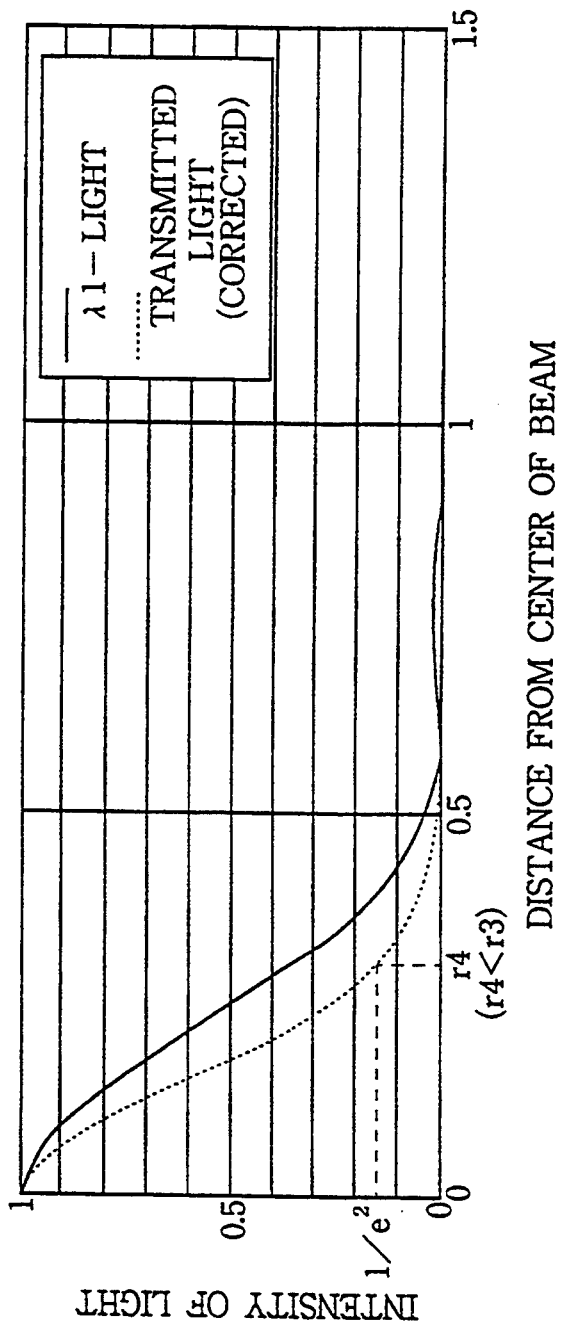
Figure 16:
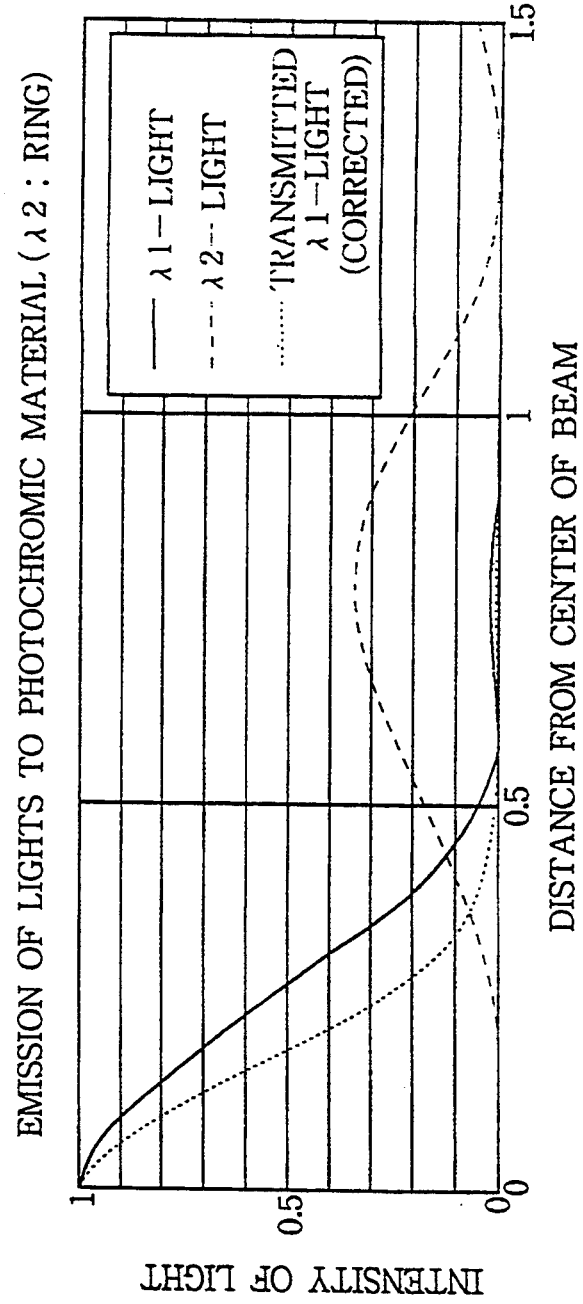
Figure 17:
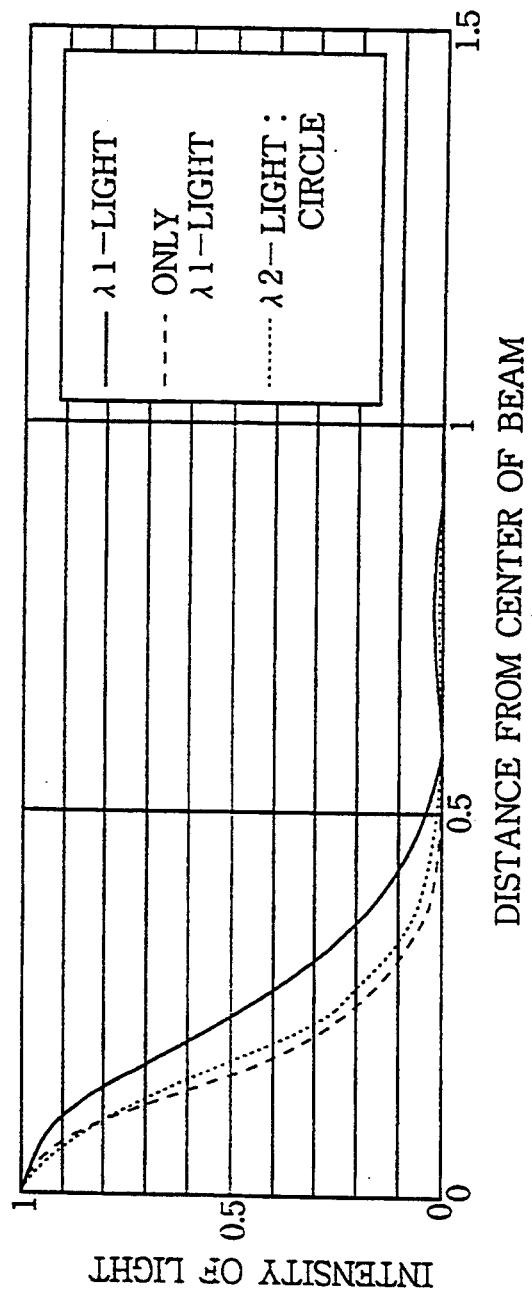
Figure 18:
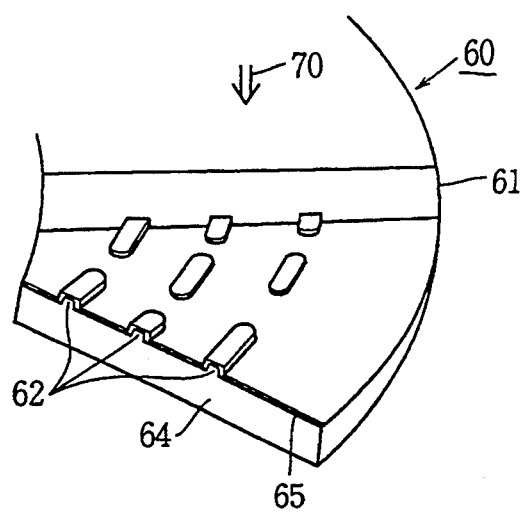
FIGS. 18a, 18b and 18c are schematic diagrams showing a conventional optical disc.
Figure 18:
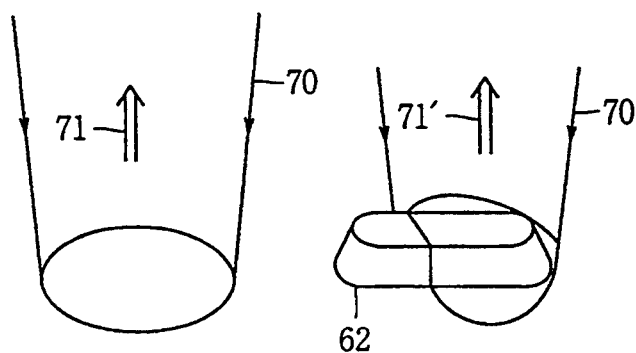
Figure 18:
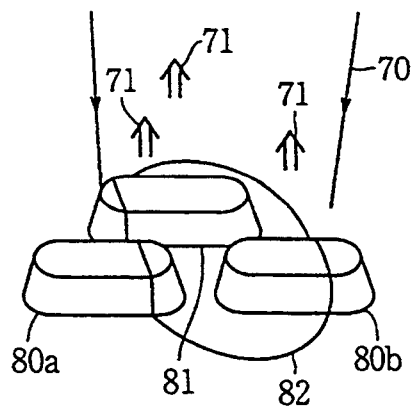

As shown in FIG. 16, if the auxiliary light is emitted in the form of ring in sectional shape, the diameter is smaller than the diameter of the light of the circle as shown in FIG. 17 and approximately the same as the diameter r4 in FIG. 15. It is possible to reproduce information of high recording density. Since the area before and after the reading light is masked by the auxiliary light, the recording density in the recording track direction is increased without increasing crosstalk.

In accordance with the present invention, the photochromic film is provided on the optical disc for changing the transmittance or the reflectance thereof by the light having a different wavelength. The information pits are read out by one of the lights and masked by the other light. Thus, it is possible to control the information reading zone. Furthermore, the information is reproduced by the light corresponding to the distribution of intensities of the lights. Thus, the recorded information only in a reading area can be reproduced without crosstalking.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An optical disc having a recording film disposed at a light receiving side and having information recorded thereon comprising:
    a photochromic material film provided on the recording film at an information recorded side;
    a reflection film disposed on the photochromic material film; and
    the photochromic material film being made of a photochromic material which has a first state dependent on reading light having a first wavelength, where transmittance or reflectance of the material changes so as to enable reading of the recorded information, and has a second state dependent on auxiliary light having a second wavelength, where the transmittance or reflectance changes so as to disable the reading of the recorded information.

2. The optical disc according to claim 1 wherein the second wavelength is longer than the first wavelength.

3. A system for reproducing an optical disc having a recording film with information recorded thereon, a photochromic material film provided adjacent the recording film, the photochromic material film being made of a photochromic material which has a first state dependent on reading light having a first wavelength, where transmittance or reflectance of the material changes so as to enable reading of the recorded information, and has a second state dependent on auxiliary light having a second wavelength, where the transmittance or reflectance changes so as to disabling the reading of the recorded information, comprising:
    a first optical system for irradiating a first zone of the optical disc with said reading light;
    a second optical system for irradiating a second zone adjacent the first zone with said auxiliary light;
    a reproducing system for receiving reading light reflected from the optical disc and for reproducing the recorded information.

4. The system according to claim 3, wherein a beam of the auxiliary light has a sectional shape of a ring around a beam of the reading light.

* * * * *